US012052656B2

United States Patent
Cogan et al.

(10) Patent No.: US 12,052,656 B2
(45) Date of Patent: Jul. 30, 2024

(54) SHIM APPLICATION FOR ENCLAVE SEPARATION

(71) Applicant: T-Mobile Innovations LLC, Overland Park, KS (US)

(72) Inventors: Andrei Nicolae Cogan, Lee's Summit, MO (US); Paul Farag, Renton, WA (US); Michael Zwarts, Snohomish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 351 days.

(21) Appl. No.: 17/569,324

(22) Filed: Jan. 5, 2022

(65) Prior Publication Data

US 2023/0217356 A1    Jul. 6, 2023

(51) Int. Cl.
| | |
|---|---|
| *G06F 21/62* | (2013.01) |
| *G06F 9/455* | (2018.01) |
| *H04W 40/04* | (2009.01) |
| *H04W 48/08* | (2009.01) |
| *H04W 48/16* | (2009.01) |
| *H04W 72/51* | (2023.01) |

(52) U.S. Cl.
CPC ........ *H04W 48/16* (2013.01); *G06F 9/45558* (2013.01); *H04W 40/04* (2013.01); *H04W 48/08* (2013.01); *H04W 72/51* (2023.01); *G06F 2009/45595* (2013.01)

(58) Field of Classification Search
CPC ..... H04W 48/16; H04W 40/04; H04W 48/08; H04W 72/51; H04W 12/02; H04W 12/088; G06F 9/45558; G06F 2009/45595; G06F 2009/45587; G06F 21/53; G06F 21/6245; G06F 21/74
See application file for complete search history.

(56) References Cited

U.S. PATENT DOCUMENTS

| | | | | |
|---|---|---|---|---|
| 2013/0312117 | A1* | 11/2013 | Sapp, II | G06F 21/62 726/30 |
| 2016/0381005 | A1* | 12/2016 | Vij | G06F 21/57 726/7 |
| 2022/0014456 | A1* | 1/2022 | Bandi | H04L 43/10 |
| 2022/0050921 | A1* | 2/2022 | LaFever | H04L 63/20 |
| 2023/0198978 | A1* | 6/2023 | Wagener | G06F 21/31 726/4 |

* cited by examiner

*Primary Examiner* — Lan-Huong Truong

(57) ABSTRACT

A method comprises receiving, by a shim application of a user equipment (UE), an outbound communication from a first application destined for an external device, prior to transmitting the outbound communication to the external device, determining, by the shim application, whether to forward the outbound communication to the external device, via a radio interface of the UE, based on a first policy, receiving, by the shim application, an inbound communication destined for a second application from the external device, via the radio interface, determining, by the shim application, whether to forward the inbound communication to the second application based on a second policy, receiving, by the shim application, an inter-enclave communication from the first application destined for the second application, and determining, by the shim application, whether to forward the inter-enclave communication to the second application based on the second policy.

20 Claims, 11 Drawing Sheets

SHIM APPLICATION FOR ENCLAVE SEPARATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Recently, users have begun to use a single mobile communication device for many purposes, including personal, business, educational, and recreational purposes. For example, employees have increasingly begun to use their personal mobile communication device for business purposes by installing and running applications used for business tasks. Similarly, students have also begun to use their personal computers for education purposes by installing and running applications used for education related tasks. In this way, a mobile communication device or a personal computer may include data and applications that are dedicated to a specific entity (e.g., a company or a university), and this data may be easily intermixed with a user's personal data. Meanwhile, the mobile communication device or personal computer may also include private data of a user stemming from private applications running on the user device, such as, for example, a social media application or a gaming application. Due to comingling of these different applications, the private data of the user may be accessed by business applications and/or educational applications also running on the device. Similarly, the confidential business data from the business applications may also be accessed by the other applications running on the device, which are not otherwise tied to the employer.

SUMMARY

In an embodiment, a method of enforcing isolation enclaves in a user equipment (UE) is disclosed. The method includes managing, by an enclave application of the UE, a first enclave associated with a first entity and comprising a plurality of first dedicated hardware resources, wherein a first application is running on the first dedicated hardware resources of the first enclave, managing, by the enclave application, a second enclave associated with a second entity and comprising a plurality of second dedicated hardware resources, wherein a second application is running on the second dedicated hardware resources of the second enclave, monitoring, by a shim application of the UE, an outbound communication from the first application prior to a radio interface of the UE transmitting the outbound communication to an external device, to determine whether transmission of the outbound communication to the external device is permitted, monitoring, by a shim application of the UE, an inbound communication from the external device destined for the first application prior to the first application receiving the inbound communication, to determine whether reception of the inbound communication by the first application, via the radio interface of the UE, is permitted based on the first application being associated with the first enclave, and intercepting, by the shim application, an inter-enclave communication from the first application to the second application prior to the second application receiving the inter-enclave communication, to determine whether reception of the inter-enclave communication by the second application is permitted based on the first application being associated with the first enclave or based on the second application being associated with the second enclave.

In another embodiment, a UE comprising a processor, a non-transitory memory coupled to the processor, a radio interface, a first enclave, a second enclave, and a shim application is disclosed. The first enclave is stored in the non-transitory memory, and associated with a first entity. The first enclave comprises first dedicated hardware resources, a first container stored in the non-transitory memory, wherein the first container comprises one or more first applications associated with the first entity, and a first enclave application, stored in the non-transitory memory, such that when executed by the processor, causes the processor to be configured to manage allocation of resources within the first dedicated hardware resources for the first container. The second enclave is stored in the non-transitory memory, and associated with a second entity. The second enclave comprises second dedicated hardware resources, a second container stored in the non-transitory memory, wherein the second container comprises one or more second applications associated with the second entity, and a second enclave application, stored in the non-transitory memory, such that when executed by the processor, causes the processor to be configured to manage allocation of resources within the second dedicated hardware resources for the second container. The shim application is stored in the non-transitory memory, such that when executed by the processor causes the processor to be configured to forward an outbound communication received from a first application through the radio interface to an external device, forward an inbound communication received from the radio interface to the first application, and block an inter-enclave communication received from the first application and destined for the second application.

In yet another embodiment, a method of isolating enclaves in a UE is disclosed. The method comprises managing, by an enclave application of the UE, a first enclave associated with a first entity and comprising a plurality of first dedicated hardware resources, wherein a first application is running on the first dedicated hardware resources of the first enclave, storing, by a non-transitory memory of the UE, a first policy describing communications that are permitted or prohibited with respect to applications running on the first dedicated hardware resources of the first enclave, managing, by the enclave application, a second enclave associated with a second entity and comprising a plurality of second dedicated hardware resources, wherein a second application is running on the second dedicated hardware resources of the second enclave, storing, by a non-transitory memory of the UE, a second policy describing communications that are permitted or prohibited with respect to applications running on the second dedicated hardware resources of the first enclave, receiving, by the shim application of the UE, an outbound communication from the first application destined for an external device, prior to transmitting the outbound communication to the external device, determining, by the shim application, whether to forward the outbound communication to the external device, via a radio interface of the UE, based on the first policy, receiving, by a shim application of the UE, an inbound communication destined for the second application from the external device, via the radio interface, prior to the second application receiving the inbound communication, determining, by the shim application, whether to forward the inbound communication to the second application based on the second policy, receiving, by the shim application, an inter-enclave communication from the first application destined for the second application prior to the second application receiving the inter-enclave communication, and determining, by the shim application, whether to forward the inter-enclave communication to the second application based on the second policy.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
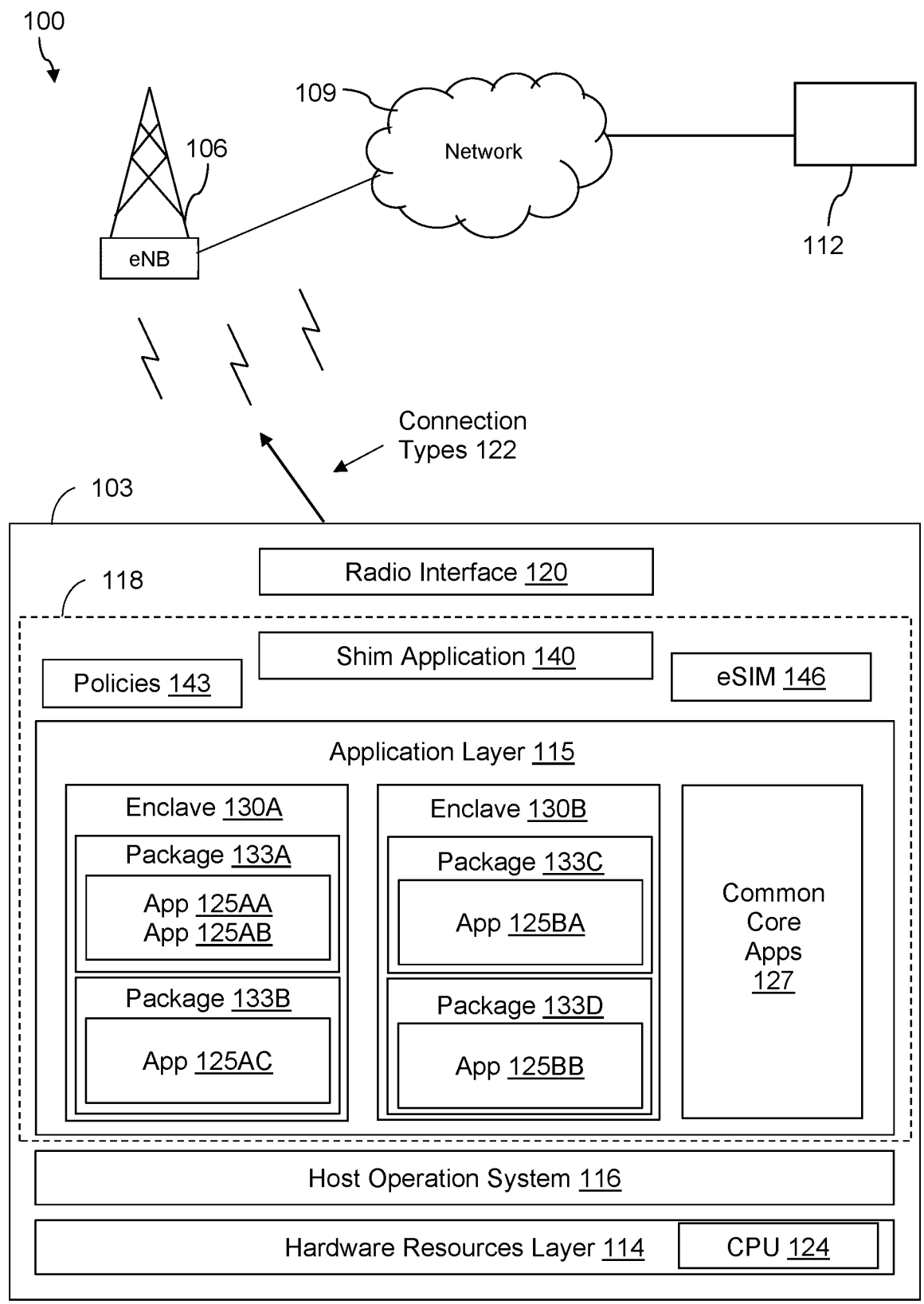
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Mobile communication devices may run various different types of applications that are each associated with a different entity, such as, for example, a user himself or herself, a business, or a school. For example, a mobile communication device may include personal applications related to personal information and activities of a user, business applications exclusively for business tasks, or educational applications exclusively for education related tasks. In some cases, a single application may include multiple instances, in which each instance is executed differently according to a particular entity associated with the user. For example, the device may include one instance of the MICROSOFT OUTLOOK application dedicated to personal electronic messages (e-mails), and another separate instance of the MICROSOFT OUTLOOK application dedicated to business related e-mails.

The device may run these applications and store data associated with the applications across one or more memories, on a per-application basis, merely ensuring that the applications have the resources to store data and perform various tasks. However, the device may store the applications and related data without considering the fact that different entities actually own and operate the different applications and data. This results in the intermingling of personal applications and personal data with employer applications and employer data, or with any other entity's applications and data. Private data associated with a personal application of the user may be accessible by business related applications, while business related data associated with confidential business information may be accessible by personal applications. For example, when the device includes a private social media application and a business expense tracking application, both applications may be capable of accessing one another's data since the device itself may not be configured to isolate the different applications and related data. However, for security reasons, applications associated with different entities (e.g., personal, business, educational, etc.) should not be able to access applications and data associated with other entities, unless explicitly permitted otherwise.

The embodiments disclosed herein seek to resolve the foregoing issues by isolating the applications associated with (e.g., owned or operated by) different entities such that the different applications run in their own respective, secure environments, hereinafter referred to as "enclaves." The embodiments disclosed herein also provide a shim application that may function to enforce security among the different enclaves by monitoring and restricting communications associated with applications running in the different enclaves.

In an embodiment, the device may include an enclave for each entity associated with the user of the device. An enclave refers to a set of dedicated hardware (e.g., memories, processor cores, input/output devices, etc.) and software resources (e.g., virtual machines (VMs), hypervisors, etc.). The dedicated hardware and software resources in the enclave may be assigned to a single entity, or one or more applications owned and/or operated by the single entity. Each enclave may include the one or more applications (or instances of the applications) and data that may be owned and operated by the respective entity.

For example, an enclave associated with the personal entity (the user himself or himself) may include dedicated hardware and software resources, such as, a memory range (e.g., a portion of the random-access memory (RAM)) of the device, one or more processor cores, and/or one or more VMs. The dedicated memory range of the enclave may be used to store and run personal applications and personal data, such as, a gaming application, a social media application, a video stitching application, etc. Meanwhile, an enclave associated with a business entity (e.g., a company at which the user is employed) may include different dedicated hardware and software resources, such as a different memory range. The dedicated memory range of the enclave may be used to store and run business applications and business data, such as, expense reporting applications, accounting applications, business document management applications, etc.

In an embodiment, the dedicated resources for each of the enclaves on a device may be pre-configured by an original manufacturer of the device or may be pre-configured upon installation of the enclave-respective application. In another embodiment, the dedicated hardware resources for each of the enclaves may be configured externally, for example, by an application or website accessible by an operator or entity. For example, an operator at an employer site may enter the hardware and software resources for one or more business applications through a website on an external business device (e.g., a computing device at the employer location). The external business device may push the specifications related to the resources of the enclave to the device, and the device may be configured to allocate the resources for the enclave based on the specifications, prior to or at the time of installing the business applications into the business enclave. In an embodiment, the specifications of the hardware and software resources dedicated to an enclave may be updated either manually at the device or by communicating with an external device. For example, an operator may use an employer device to send updated specifications to the device. The operator may enter the updated specifications using an application or website running on the employer device. The updated specifications may be, for example, a larger memory range dedicated to the enclave. The device may receive the updated specifications from the external business device and re-configure the hardware and software resources at the device to account for the larger memory range dedicated to the enclave.

In an embodiment, each enclave may include one or more packages, which may be containers, VMs, or hypervisors. Each package includes the code, libraries, and dependencies used to run the applications in the package. A single package may include only one application, or may include multiple applications. In one embodiment, each package may be a container. A container refers to a standard unit of software that packages up code and all dependencies of an application, such that the application may run reliably at a computing environment in a user device. The dependencies of an application may include, for example, a runtime, system tools, libraries, settings, executable files, configuration data, virtual server, etc. Each container across multiple enclaves may communicate with a single host operating system (OS) of the device. The host OS is installed at the device and functions to interact with the underlying hardware of the device to perform actions on behalf of the application. In another embodiment, each package may be a VM including a respective guest OS, which operates independently of the host OS. The guest OS may share resources with the host OS and communicate with the host OS to interact with the hardware of the device to perform actions on behalf of the application.

Once the enclaves are generated and maintained, a shim application may be used to implement hardware agnostic routing control by routing traffic to distinct secure enclaves based on an associated application. The shim application may operate to enforce separation across the different enclaves and isolate applications within different enclaves. The shim application filters communications being received by and transmitted from an application at the enclave based on a memory address scheme, as further described herein. In an embodiment, the shim application is an intermediary application functionally positioned between a radio interface of the device and each of the enclaves and associated applications. In an embodiment, the shim application may be embedded as part of the host OS.

In an embodiment, any incoming communications received by the device from an external device may be first passed to the shim application, at which point the shim application may inspect the contents of the incoming communication to detect a destination of the incoming communication or an application associated with the incoming communication. For example, the incoming communication may include an identification of a destination application or an address within the dedicated memory address range of the destination application.

The shim application may then extract a policy associated with the enclave of the application associated with the incoming communication. The policy of the enclave may include rules or entitlements that indicate whether certain communications are permitted or prohibited based on various factors. For example, the various factors may include information regarding the connection type over which the communication is transmitted or received, sender of the incoming communication, an address of the destination included in the incoming communication, a time at which the incoming communication is received, a location at which the incoming communication is received, a size of the incoming communication, or any other attribute of the communication. The policy may be pre-configured at the device or received from an operator of the entity via, for example, a website or application at an external device associated with the entity. The shim application may determine whether to forward the incoming communication to the destination application in the enclave based on the policy. If so, the shim application passes the incoming communication received from the radio interface to the application in the enclave. If not, the shim application drops the incoming communication.

In an embodiment, similar steps may be performed for outgoing communications originating at an application at an enclave and destined for an external device. The outgoing communication may first pass through the shim application prior to being forwarded to the radio interface for transmission. The shim application may extract a policy associated with the enclave of the application sending the outgoing communication, and determine whether to permit transmission of the outgoing communication based on the policy. If so, the shim application passes the outgoing communication to the radio interface for transmission to the external device. If not, the shim application drops the outgoing communication.

With regard to communications between enclaves, also referred to herein as "inter-enclave communications," the shim application may intercept all inter-enclave communications and determine a policy for the sending enclave and the destination enclave. The inter-enclave communication may include information regarding the sending enclave and/or the destination enclave, such as, for example an identification of the enclave, a memory address in the enclave, etc. When no such policy exists, the default policy may be for the shim application to drop all inter-enclave communications, to isolate the two enclaves and prevent applications at different enclaves from accessing one another's data. However, in some cases, a policy may be set that explicitly permits inter-enclave communications originating at the sending enclave and destined for the destination enclave. In such a case, the shim application may permit the inter-enclave communication and forward the inter-enclave communications to the destination enclave based on the information in the inter-enclave communication.

In an embodiment, the incoming communications, outgoing communications, and inter-enclave communications may be port-based communications, network communications passing through the radio interface, application programming interface (API) based communications, and in-memory communications. The shim application may monitor and filter each of these types of communications based on a default policy that prohibits inter-enclave communications, regardless of whether the communications are port-based, API based, or in-memory based. Otherwise, the shim application may monitor and filter each of these types of communications based on preset policies associated with each enclave.

As an illustrative example, suppose a user device includes applications associated with an education entity and applications associated with a business entity. In an embodiment, the education entity applications and data associated with the education entity applications may be stored in a first enclave, while the business entity applications and data associated with the business entity applications may be stored in a second enclave.

The education entity applications may be stored in the first enclave in one or more containers. Similarly, the business entity applications may be stored in the second enclave in one or more containers. As further described herein, the applications within an enclave, or the containers with an enclave, may communicate with one another to allocate resources within the enclave. For example, an enclave application may allocate resources within an enclave to different containers for the applications within each container. Each container may communicate directly with the host OS, or via a guest OS, to access hardware at the user device and perform tasks on behalf of the applications in the container.

The user device may store policies associated with each of the enclaves. A policy for the first enclave may permit inter-enclave communication, meaning the first enclave may permit other applications access to data in the first enclave. The user device may include another policy for the first enclave, indicating that only outgoing communications to certain pre-authorized destinations are permitted. The user device may not have a pre-stored policy regarding inter-enclave communications for the second enclave, but the user device may set a default policy for the second enclave that does not permit inter-enclave communication. The user device may also include a policy for the second enclave to prohibit incoming communications when the user device is not on a secure wireless connection.

The shim application may intercept and filter communications at the user device based on the policies above. For example, when a business entity application transmits an inter-enclave communication to an education entity application, the shim application may first intercept the inter-enclave communication. The shim application may obtain a policy for the first enclave associated with the education entity application, which permits other applications access to data in the first enclave. Accordingly, the shim application may forward the inter-enclave communication to the education entity application based on the policy.

The education entity application may generate and transmit an outgoing communication toward the radio interface of the user device, but the shim application may intercept the outgoing communication before it is received by the radio interface. The shim application may obtain the policy for the first enclave associated with the education entity application, which only permits outgoing communications to certain pre-authorized destinations. The shim application may extract the destination address from the outgoing communication to determine whether the destination address is one of the pre-authorized destinations. If so, the shim application may forward the outgoing communication to the radio interface for transmission. If not, the shim application may drop or discard the outgoing communication.

The shim application may perform similar steps with regard to the business entity applications of the second enclave. For example, when an education entity application transmits an inter-enclave communication to a business entity application, the shim application may drop or discard the inter-enclave communication, since the policy of second enclave prohibits inter-enclave communication.

When the radio interface forwards an incoming communication to the business entity application at the second enclave, the shim application may intercept the incoming communication before it is received by the business entity application. The shim application may obtain the policy for the second enclave associated with the business entity application, which indicates that incoming communications is only permitted when the user device is on a secure connection. The shim application may determine whether the user device is on a secure wireless connection. If so, the shim application forwards the incoming communication to the business entity application. If not, the shim application drops or discards the incoming communication.

In this way, the shim application acts as part of the host OS by filtering access to various hardware resources, such as memory in the enclaves and the radio interface, according to certain policies. The shim application may either forward or drop communications accordingly, thereby reducing the processing and communications resources used to forward communications internally and via the radio interface. The shim application also serves to enforce security across the different enclaves in the device, thereby ensuring data protection and integrity of data across the different enclaves. Lastly, the embodiments disclosed herein may manage enclaves at the device, such that the hardware and the software resources may be updated on-demand as needed. In this way, the embodiments disclosed herein provide a more flexible and efficient manner of managing applications and data, compared to prior hardware-oriented approaches.

In an embodiment, the shim application may also have access to one or more electronic subscriber identity module (e-SIM) profiles stored at the device, in which each e-SIM profile includes the network credentials that may be used by the device to access a carrier network. In an embodiment, a policy may be set indicating that applications within a first enclave may only be permitted to communicate via a first carrier network, using a first e-SIM profile. Meanwhile, another policy may be set indicating that applications within a second enclave may only be permitted to communicate via a second carrier network, using a second e-SIM profile. The shim application may use these policies to regulate and filter incoming and outgoing communications for these enclaves. For example, when an incoming communication is received at the radio interface for an application in the first enclave and then passed to the shim application, the shim application may determine that the incoming communication is received via the second carrier network. As noted above, the policy for the first enclave does not permit communications via the second carrier network, and as such, the shim application may drop the incoming communication.

As another illustrative example, suppose the shim application intercepts an outgoing communication originating at an application in the second enclave, and suppose the device is currently activating the first e-SIM profile. The shim application may determine that the outgoing communication is not permitted to be transmitted using the first carrier network associated with the first e-SIM profile. The shim application may determine whether the device may activate the second e-SIM profile based on whether the device has access to a cell site corresponding to the second carrier network, and if so, instruct the device to active the second e-SIM profile. Once activated, the shim application may forward the outgoing communication to the radio interface for transmission. If the second e-SIM profile cannot be activated, the shim application may drop the outgoing communication.

Turning now to FIG. 1, a system 100 according to an embodiment of the disclosure is described. In an embodiment, system 100 comprises a mobile communication device, hereafter referred to as a user equipment (UE) 103, a cell site 106, a network 109, and an external device 112.

The UE 103 may be one of a mobile phone, a smart phone, a personal digital assistant (PDA), a wearable computer, a headset computer, a laptop computer, a notebook computer, or a tablet computer. Network 109 comprises one or more private networks, one or more public networks, or a combination thereof. The cell site 106 may be a cell tower or base station in a carrier network, including all of the equipment used to receive and transmit radio signals for cellular voice and data transmission. The external device 112 may be a device, such as, for example, a computing device, mobile phone, smart phone, PDA, or wearable device, that may communicate with the UE 103 via network 109. As should be appreciated, system 100 may comprise any number of UEs 103, any number of cell sites 106, and any number of external devices.

As shown in FIG. 1, UE 103 comprises a hardware resources layer 114, a host OS 116, an application layer 115, a non-transitory memory 118, and a radio interface 120. As should be appreciated, UE 103 may include other components and layers not otherwise shown in FIG. 1. The hardware resources layer 114 includes hardware components on the UE 102, such as, for example, a central processing unit (CPU) 124, microphone, speaker, BLUETOOTH transceiver, camera, Wi-Fi transceiver, modem, radio transceiver, or any other hardware component of the UE. While the radio interface 120 is shown separate from the hardware resources layer 114, the hardware resources layer 114 may also include the radio interface 120 in an embodiment. In another embodiment, the radio interface 120 may be a radio interface layer on the UE 103, which provides an interface to a radio and modem in the hardware resources layer 114.

The radio interface 120 may include the hardware and/or software resources, such as radio transceivers, configured to provide a wireless connection to one or more external devices 112, using one or more different connection types 122. For example, the connection types 122 may include a Wi-Fi connection, a BLUETOOTH connection, a Near Field Communication (NFC) connection, a 5th generation (5G) connection, a long term evolution (LTE) connection, a code division multiple access (CDMA) connection, a global system for mobile communications (GSM) connection, a worldwide interoperability for microwave access (WiMAX) telecommunication protocol connection, or any other type of wireless connection. In some cases, the connection types 122 may also include connections provided by one or more different carrier networks, operated by different telecommunications service providers, such as, for example, T-MOBILE.

The host OS 116 may be software installed on the UE 103 that interacts with the hardware in the hardware resource layer 117 to perform functions on behalf of applications in the application layer 115. The host OS 116 may include a kernel and one or more libraries, runtimes, and frameworks. The kernel may provide an underlying system component and an underlying system service, for example, security, memory management, process management, or a hardware driver. The hardware driver may include a display driver, a processor driver, a memory driver, etc. The library and runtime may provide library files and execution environments for an executable program at runtime.

The application layer 115 provides services directly for one or more applications, and allows a user of the UE 103 to access, retrieve, and manage files using an application. The application layer 115 may include multiple applications 125AA, 125AB, 125AC, 125BA, and 125BB, and common core applications 127. Applications 125AA-125AC and 125BA-BB may each be applications that are respectively associated with a different entity (e.g., personal, business, educational, recreational, etc.). Meanwhile, the common core applications 127 may not necessarily be associated with a particular entity, but instead, may be accessed by all processes running on the UE 103.

In an embodiment, the applications 125AA-125AC and 125BA-BB may be each included in a separate enclave 130A-B, respectively, since the applications 125AA-125AC and 125BA-BB are associated with different entities. As mentioned above, an enclave 130A-C refers to a set of dedicated hardware (e.g., memories, processor cores, input/output devices) and software resources which are assigned to one or more enclaves 130A-B or assigned to one or more applications 125AA-125AC and 125BA-BB within the enclave 130A-B. Each enclave 130A-B may include the one or more applications 125AA-125AC and 125BA-BC (or instances of the applications 125AA-125AC and 125BA-BB) and data that may be owned and operated by the respective entity.

As shown in FIG. 1, enclave 130A includes resources to store and run applications 125AA-125AC, enclave 130B includes resources to store and run application 125BA-125BB. In an embodiment, within an enclave 130A-B, one or more applications 125AA-125AC 125BA-125B may be stored within a package 133A-D. A package 133A-D may be a container, VM, hypervisor, or any other application package. As mentioned above, each package 133 includes the code, libraries, and dependencies used to run one or more applications 125AA-125AC and 125BA-BB in the package 133A-D. A single package 133A-D may include only one application 125AA-125AC and 125BA-BB, or may include multiple applications 125AA-125AC and 125BA-BB. As shown in FIG. 1, enclave 130A includes two packages 133A-B. Package 133 includes two applications 125AA-AB and package 133 includes a single application 125AC. Similarly, enclave 130B includes package 133C and 133D. Package 133C includes application 125BA, and package 133D includes application 125BB.

In one embodiment, each package 133A-D may be a container, and each package 133A-D communicates with the host OS 116 and shares the host OS 116, to perform functions on behalf of the applications 125AA-AC and 125BA-BB. In another embodiment, each package 133A-D may be a VM including a respective guest OS, which operates independently of the host OS 116. The guest OS may share resources with the host OS 116 and communicate with the host OS 116, to interact with the hardware of the device to perform actions on behalf of the applications 125AA-AC and 125BA-BB.

In an embodiment, the non-transitory memory 118 of the UE 103 may store the application layer 115, or at least the portion of the application layer 115 including the enclaves 130A-B and the common core applications 127. In an embodiment, the non-transitory memory 118 may also include the shim application 140, policies 143, and one or more eSIM profiles 146 (shown as "eSIM 146" in FIG. 1). The shim application 140 may be configured to enforce isolation between the different enclaves 130A-B and filter communications being received by and transmitted from an application 125AA-AC and 125BA-BB within the different enclaves 130A-B. The shim application 140 may be configured to monitor and filter incoming communications, outgoing communications, and inter-enclave communications relative to the applications 125AA-AC and 125BA-BC. The incoming communications, outgoing communications, and inter-enclave communications may be port-based, API-based, network-based, or in-memory based. The incoming communications, outgoing communications, and inter-enclave communications may refer to data packets, messages, frames, beacons, and/or any other communication containing data related to one of the applications 125AA-AC and 125BA-BC in an enclave 130A-B.

In an embodiment, the shim application 140 may monitor and filter communications based on a policy 143, which may be associated with an application 125AA-AC and 125BA-BC and/or an enclave 130A-B. A policy 143 may include a rule or entitlement related to inbound communications, outbound communications, or inter-enclave communications. An inbound communication refers to a communication intended to be received by an application 125AA-AC and 125BA-BB, such that the inbound communication identifies or indicates a memory address of a destination application 125AA-AC and 125BA-BB. An outbound communication refers to a communication being generated and transmitted by an application 125AA-AC and 125BA-BB, such that the outbound communication identifies or indicates a memory address of a sending application 125AA-AC and 125BA-BB. An inter-enclave communication refers to a communication being generated and transmitted by an application 125AA-AC in a first enclave 130A, and intended to be received by an application 125BA-BB in a second enclave 130B. An application 125AA-AC and 125BA-BC or an enclave 130A-B may be associated with one or more policies 143. The inter-enclave communication identifies or indicates a memory address of a sending application 125AA-AC and 125BA-BB and/or identifies or indicates a memory address of a destination application 125AA-AC and 125BA-BB.

The policy 143 may refer to rules or entitlements that indicate whether certain communications are permitted based on various factors, such as, for example, the connection type over which an incoming communication is received, the connection type over which an outgoing communication may be transmitted, a sender (e.g., application 125AA-AC and 125BA-BB of an incoming or inter-enclave communication, a destination (e.g., 125AA-AC and 125BA-BB) of an outgoing or inter-enclave communication, an address of the sender indicated in the communication, an address of the destination indicated in the communication, a time at which the incoming or inter-enclave communication is received, a time at which an outgoing or inter-enclave communication is transmitted, a geographical location at which the communication is received or transmitted, a size of the communication, an encoding format of the communication, or any other attribute of the communication.

In an embodiment, a default policy 143 may be set for all applications 125AA-AC and 125BA-BB, prohibiting all inter-enclave communications to preserve the integrity and increase security for data and applications stored within enclaves 130A-B. In an embodiment, one or more enclaves 130A-B may be pre-configured or otherwise later updated to indicate that inter-enclave communications are permitted under certain conditions. For example, enclave 130A may be associated with a policy 143, indicating that inter-enclave communications received from application 125BA, or indicating a memory address associated with application 125BA, are permitted. The policy 143 may also indicate that inter-enclave communications received from application 125BB, or indicating a memory address associated with application 125BB, are prohibited.

As another example, the enclave 130A may be associated with another policy 143 indicating that outgoing communications may only be permitted when the destination of the outgoing communications is an external device 112 associated with a domain of the sending application 125AA-AC. As yet another example, the enclave 130A may be associated with another policy 143 indicating that incoming communications may only be permitted via the radio interface 120 using a Wi-Fi connection or an LTE connection, and in an embodiment, using a particular carrier network.

The eSIM profiles 146 may be stored in an embedded universal integrated circuit card (eUICC) of the UE 103. Each eSIM profile 146 may be provisioned with the network access keys and/or network access credentials, branding information, applications, and other data artifacts for a different cell site 106 and corresponding carrier network. As mentioned above, a policy 143 may indicate that incoming or outgoing communications may only be received and transmitted by the radio interface 120 when a particular eSIM profile 146 is activated. In an embodiment, the shim application 140 may use the policy 143 to determine whether certain eSIM profiles 146 may be activated or deactivated, based on availability and accessibility of cell sites 106 corresponding to different carrier networks and corresponding eSIM profiles 146.

For example, when the radio interface 120 receives an incoming communication destined for application 125BA in enclave 130B, the radio interface 120 passes the incoming communication to the shim application 140, instead of forwarding the incoming communication directly to application 125BA. The shim application 140 may determine a policy 143 applicable to the enclave 130B, which may indicate that only incoming communications received over a particular carrier network are permitted. The shim application 140 may determine that the eSIM profile 146 corresponding to the particular carrier network is not activated, and thus the incoming communication is dropped such that the application 125BA does not receive the incoming communication.

As another example, application 125BB may generate an outgoing communication destined for the external device 112, and the policy 143 associated with enclave 130B may indicate that outgoing communications from enclave 130B may only be permitted over a particular carrier network LTE connection. The shim application 140 may first receive this outgoing communication prior to the radio interface 120 transmitting the outgoing communication. The shim application 140 may then obtain the policy 143, and then determine whether the eSIM profile 146 associated with the carrier network LTE connection is activated. When the eSIM profile 146 associated with the carrier network LTE connection is not activated, the shim application 140 may determine whether the UE 103 has access to a cell site 106 corresponding to the carrier network. When the UE has access to the carrier network, the shim application 140 may deactivate a currently activated eSIM profile 146, and then activate the eSIM profile 146 with the network credentials to connect to the carrier network LTE connection. Upon activation, the shim application 140 may forward the outgoing communication to the radio interface 120 for transmission to the external device 112 using the carrier network LTE connection.

In an embodiment, the shim application 140 may pass all communications from any application 125AA-AC or 125BA-BB to the common core applications 127, since the common core applications 127 may not carry sensitive data that should be restricted. In an embodiment, the shim application 140 may intercept a port-based communication, either incoming, outgoing, or inter-enclave, indicating a particular Internet Protocol (IP) address or port, identifying a destination application 125AA-AC or 125BA-BB or enclave 130A-B. The shim application 140 may obtain the policy 143 of the enclave 130A-B to determine whether to forward or drop the communication based on whether the policy 143 indicates that the IP address or port is permitted to communicate with the enclave 130A-B.

In an embodiment, the shim application 140 may intercept an API-based communication, either incoming, outgoing, or inter-enclave. The API-based communication may be an API call to a particular application 125AA-AC or 125BA-BB or enclave 130A-B. The API call may indicate both the sender and destination enclave 130A-B by either a memory address or identifier. The shim application 140 may obtain the policy 143 of the enclave 130A-B to determine whether to forward or drop the communication based on whether the policy 143 indicates that the sender is permitted to communicate with the destination enclave 130A-B. In an embodiment, the shim application 140 filters communications based on whether the policy 143 indicates that communications originating from a sending memory address range is permitted to communicate with a particular enclave 130A-B.

The shim application 140 may be implemented as a set of API calls that function to monitor, intercept, analyze, and filter communications based on policies 143 stored in the non-transitory memory 118, based primarily on an addressing mechanism of the communications. In an embodiment, the shim application 140 may operate under an operational system support and management (OSS) functionality, for example, using an API framework installed at the UE 103. The shim application 140 may even operate to ensure that administrator applications 125AA-AC or 125BA-BB in one enclave 130A-B is not permitted to access data in other enclaves 130A-B.

In this way, the shim application 140 acts as an intermediary application that intercepts substantially all communications received from and destined to an application 125AA-AC or 125BA-BC in an enclave 130A-B. The shim application 140 may examine the contents of the communications and either forward or drop the communications based on the policies 143. In an embodiment, the shim application 140 may also activate and deactivate eSIM profiles 146 based on policies 143, incoming communications, and/or outgoing communications.

Figure 2:
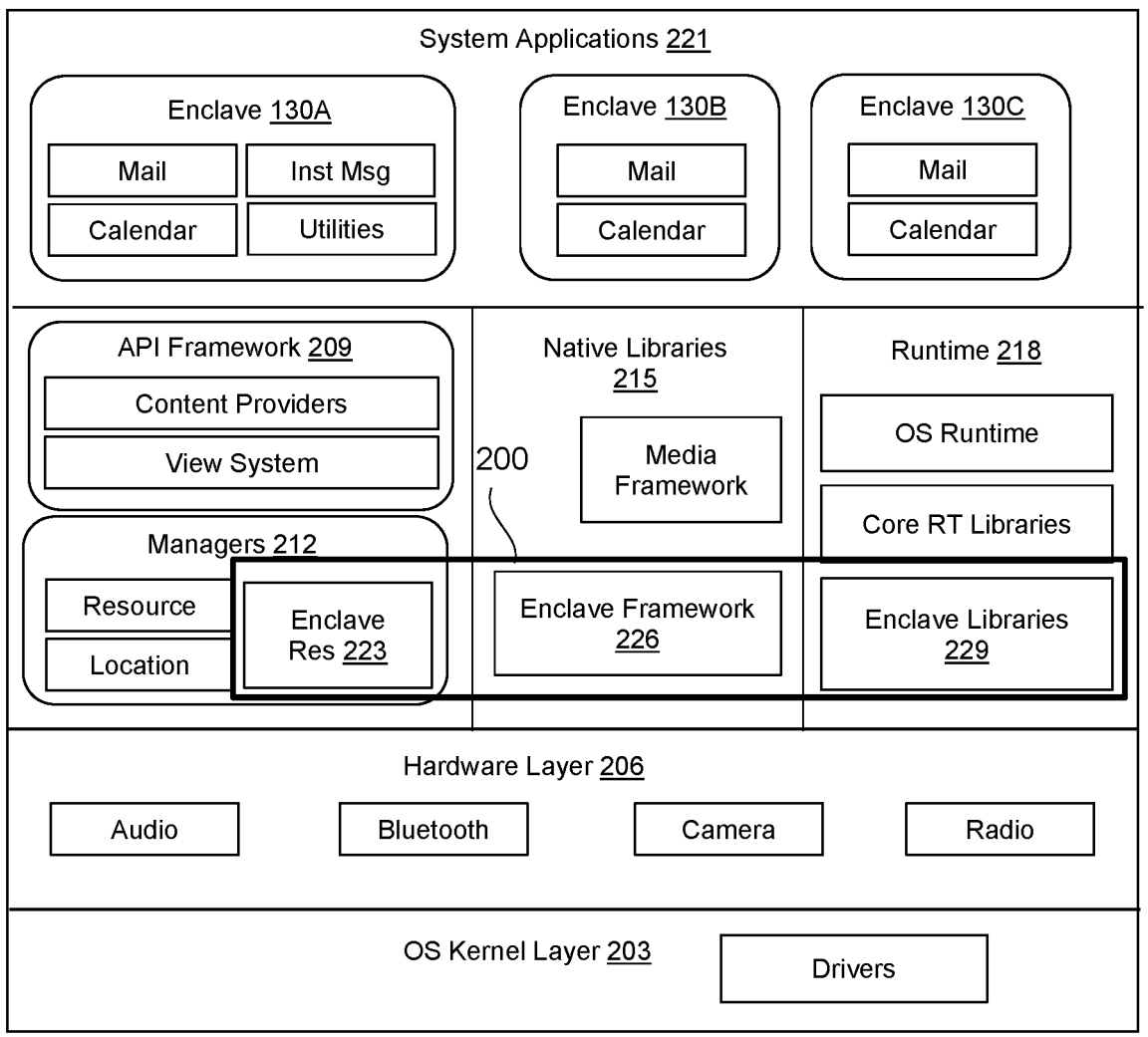
FIG. 2 is a block diagram of a user equipment (UE) according to an embodiment of the disclosure.

Turn now to FIG. 2, the logical architecture of the UE 103 according to an embodiment of the disclosure is described. As shown in FIG. 2, the logical architecture of the UE 103 includes the OS kernel layer 203, the hardware layer 206, an API framework 209, managers 212, native libraries 215, runtime 218, and system applications 221. The OS kernel layer 203 may be part of the host OS 116, and the software within the kernel layer 203 may be in control of the entire UE 103. The code of the OS kernel layer 203 facilitates interactions between the software and hardware components, in the hardware layer 206. The OS kernel layer 203 controls the hardware components in the hardware layer 206 using one or more pre-installed device drivers. The hardware layer 206 may include components similar to the hardware resource layer 114. For example, the hardware layer 206 may include audio input and output components (e.g., microphone and speaker), BLUETOOTH transceiver, camera, radio transceiver, etc.

The API framework 209 may include code libraries that provide commonly-used functionality when building web APIs. The API framework 209 may include a content provider to help an application 125AA-AC and 125BA-BC (hereinafter referred to as "application 125") manage access to data stored in the enclave 130A-B. The API framework 209 may also include a view system, which may be used to build a user interface for one or more of the applications 125. The managers 212 may be responsible for managing the APIs by designing, publishing, documenting, and analyzing the APIs in a secure environment. The managers 212 may document the resource and locations for APIs at the UE 103. In an embodiment, the managers 212 may also record the dedicated resources 223 (shown in FIG. 2 as ("Enclav Res 223") for each of the enclaves 130. For example, the managers 212 may store a memory address range of enclave 130A and store a memory address range of enclave 130B. In an embodiment, the managers 212 may also record events (e.g., reads and/or writes) occurring within the memory address range of each of the enclaves 130A-B.

The native libraries 215 may include the platform specific or cross platform libraries used by one or more applications 125 to perform various functions. For example, the native libraries 215 may be configured within shared libraries and may include a media framework library, which enables audio, video, and other time-based media to be added to applications 125. In an embodiment, the native libraries 215 may also include an enclave framework 226, which may be a library, or a function of resources and pre-compiled routines, enabling the functions of the shim application 140 as described herein.

The runtime 218 may implement portions of an execution model, to provide an environment in which applications 125 may run. The runtime 218 may include an OS runtime and core runtime libraries. An OS runtime may be an engine, or a set of code, that translates a given programming language or languages into machine code. The core runtime libraries include one or more libraries providing the functionality for programs and applications 125 to run according to a programming language. In an embodiment, the runtime 218 may also include enclave libraries 229, which may be libraries providing the functionality for the shim application 140 to perform the functions described herein. The enclave libraries 229 may help manage runtime components to interface with the hardware layer 206 and the system applications 221.

In an embodiment, shim application 140 may be associated with (e.g., include or have access to) the enclave resources 223, managed by the managers 212, the enclave framework 226, and the enclave libraries 229. In an embodiment, the shim application 140 may access the enclave resources 223, the enclave framework 226, and the enclave libraries 229 to manage, provision, and secure data in a layer between the system applications 221 and the hardware layer 206.

The system applications 221 may be similar to the application layer 115. One or more enclaves 130A-C, with dedicated enclave resources 223, may be distributed throughout the UE 103. In an embodiment, the enclave resources 223 in each enclave 130A-C may be allocated in a dynamic manner, which may be pre-configured and updated in response to receiving instructions for updating the enclave resources 223 for a particular enclave 130A-C. Each of the enclaves 130A-C may be associated with a different entity. For example, enclave 130A may be personal or private applications 125 and data; enclave 130B may be business related applications 125 and data; and enclave 130C may be country club related applications 125 and data. Each entity may essentially own and operate the applications 125 within the enclave 130A-C, and only the entity itself is permitted to add a new application 125 to the enclave 130A-C, change an application 125 within the enclave 130A-C, or delete an application 125 from the enclave 130A-C. Entities not associated with a particular enclave 130A-C may not be able to access or manipulate data or applications 125 in the enclave 130A-C. In an embodiment, an operator at the entity may manually add, change, or delete applications 125 from the enclave 130A-C, for example, via a user interface of the UE 103. For example, an application may display options on the user interface of the UE 103, and the operator may interact with the user interface to make changes to the enclave 130A-C. In another embodiment, an operator may manually add, change, or delete applications 125 from the enclave 130 from a device external to the UE 103. For example, a personal computer at a location of the country club may access an application or website, which upon authentication of the operator, may display information regarding the enclave 130C via a user interface. The operator may interact with the user interface to make changes to the enclave 130C.

In FIG. 2, enclave 130A includes a mail application 125, a calendar application 125, an instant message application 125, and a utilities application 125, and each of these applications 125 may be related to personal data of the user using the UE 103. Enclave 130B includes a mail application 125 and a calendar application 125, and each of these applications 125 may be related to business aspects of an employer of the user. Enclave 130C also includes a mail application 125 and a calendar application 125, and each of these applications 125 may be related to the country club at which the user is a paying member. In some cases, the applications 125 may refer to different instances of the same applications. For example, the mail application 125 at each of the enclaves 130A-C may be different instances of the OUTLOOK mail application 125. Similarly, the calendar application 125 at each of the enclaves 130A-C may be different instances of the same calendar application 125, such as the APPLE calendar application 125. In an embodiment, the UE 103 is configured to support different instances of the same application, running separately and distinctly at each of the enclaves 130A-C. Even though different instances of the same application 125 may be running on different enclaves 130A-C, the different instances of the application 125 may still be isolated from each other using the shim application 140. In this way, each instance of the application 125 is by default prohibited from accessing data of each of the other instances of the application 125, and thus, may also be each associated with a different policy 143. As should be appreciated, UE 103 may include any number of enclaves 130A-C, each of which may include any number of applications 125 or instances of the applications 125.

Figure 3A:
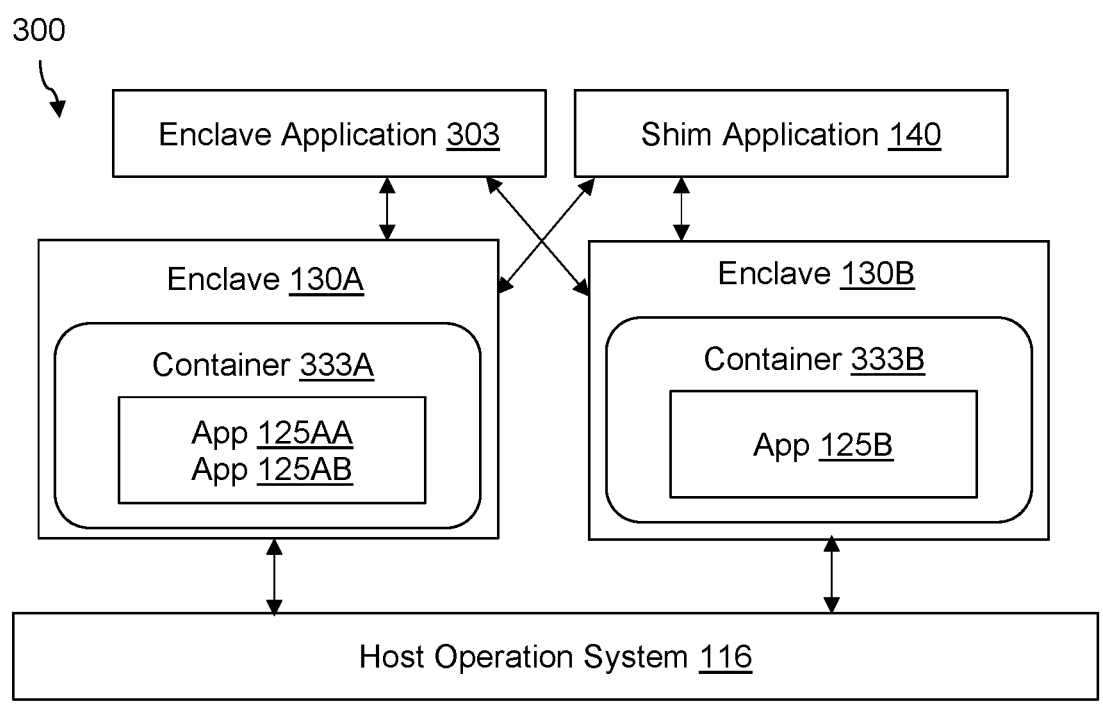
FIG. 3A is a diagram of a portion of the UE of FIGS. 1 and 2 according to an embodiment of the disclosure.

Referring now to FIG. 3A, an enclave portion 300 of the UE 103 is described according to an embodiment of the disclosure. The enclave portion 300 shows an enclave application 303, shim application 140, enclaves 130A-B, and the host OS 116. The enclave application 303 may be an application stored at the non-transitory memory 118. The enclave application 303 may be responsible for managing the enclave resources 223 within each enclave 130A-B and allocation resources to applications 125 within each enclave 130A-B based on, for example, performance and security factors. In an embodiment, the enclave application 303 may allocate hardware and software resources, such as, for example, memory space, to ensure that each application 125 within each enclave 130A-B has the hardware and software resources used to operate the application 125 and store relevant data.

In the embodiment shown in FIG. 3A, the packages 133 are implemented in the form of containers 333A-B. For example, the containers 333A-B may be docker containers, MICROSOFT containers, or any other type of software container that packages all the code, libraries, and dependencies used to run the applications 125AA-AB and 125B in the respective container 333A-B. Each enclave 130A-B includes one or more containers 333A-B, and each container 333A-B stores one or more applications 125AA-AB and 125B. In FIG. 3A, enclave 130A includes a single container 333A, storing two applications 125AA and 125AB that may be packaged together. Enclave 130B includes a single container 333B storing a single application 125B. As should be appreciated, the UE 103 may include any number of enclaves 130A-B, and each enclave may include any number of containers 333A-B. Each container 333A-B may also include any number of applications 125AA-AB and 125B.

In the embodiment shown in FIG. 3A, each container 333A-B communicates with the single host OS 116 of the UE 103, to implement the functions of the applications 125AA-AB and 125B using hardware components. In other words, each container 333A-B shares the host OS 116 of the UE 103. In this way, the host OS 116 has a purview of all the containers 333A-B stored at the UE 103. In an embodiment, the managers 212 may keep record of the resources used to implement the VMs 366A-B.

Figure 3B:
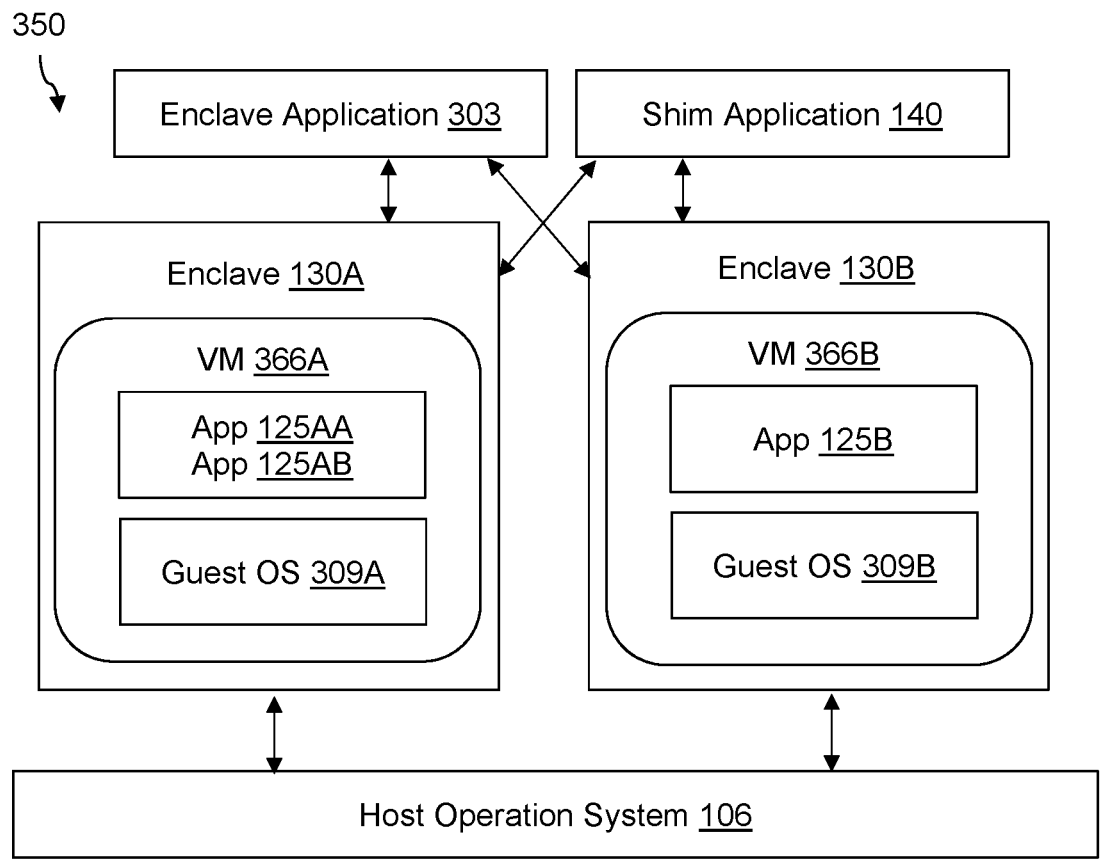
FIG. 3B is a diagram of the portion of the UE of FIGS. 1 and 2 according to another embodiment of the disclosure.

Turning now to FIG. 3B, an enclave portion 350 of the UE 103 is described according to another embodiment of the disclosure. The enclave portion 350 is similar to the enclave portion 300 of FIG. 3A, except that in FIG. 3B, the packages 133 are implemented in the form of VMs 366A-B, and each VM 366A-B includes a corresponding guest OS 309A-B. In other words, while FIG. 3A depicted packages 133A-B in the form of containers 333A-B sharing the host OS 116, FIG. 3B depicts packages 133A-B in the form of VMs 366 A-B each have a respective guest OS 309A-B.

The guest OS 309A-B operates independently from the host OS 116. While the host OS 116 is software installed on the UE 103, the guest OS 309A-B is software installed and running on each VM 366A-B. The guest OS 309A-B may share resources with the host OS 116 and communicate with the host OS 116 to interact with the hardware of the UE 103 to perform tasks on behalf of the application 125AA-AB and 125B. In this case, the host OS 116 may not have a purview of all of the applications 125AA-AB and 125B stored within different enclaves 130A-B at the UE 103. In an embodiment, the managers 212 may keep record of the resources used to implement the VMs 366A-B. In an embodiment, each of the VMs 366A-B may include one or more hypervisors to ensure the proper function and separation of the different VMs 366A-B.

The packages 133A-B are not limited to being implemented as a container 333A-B, as shown in FIG. 3A, or a VM 366A-B, as shown in FIG. 3B. The packages 133A-B may be implemented as any application package storing the code, libraries, and dependencies for an application 125AA-AB and 125B. Generally speaking, VMs 366A-B are larger in size relative to containers 333A-B, due to the VMs 366A-B each carrying a respective guest OS 309A-B.

Figure 4:
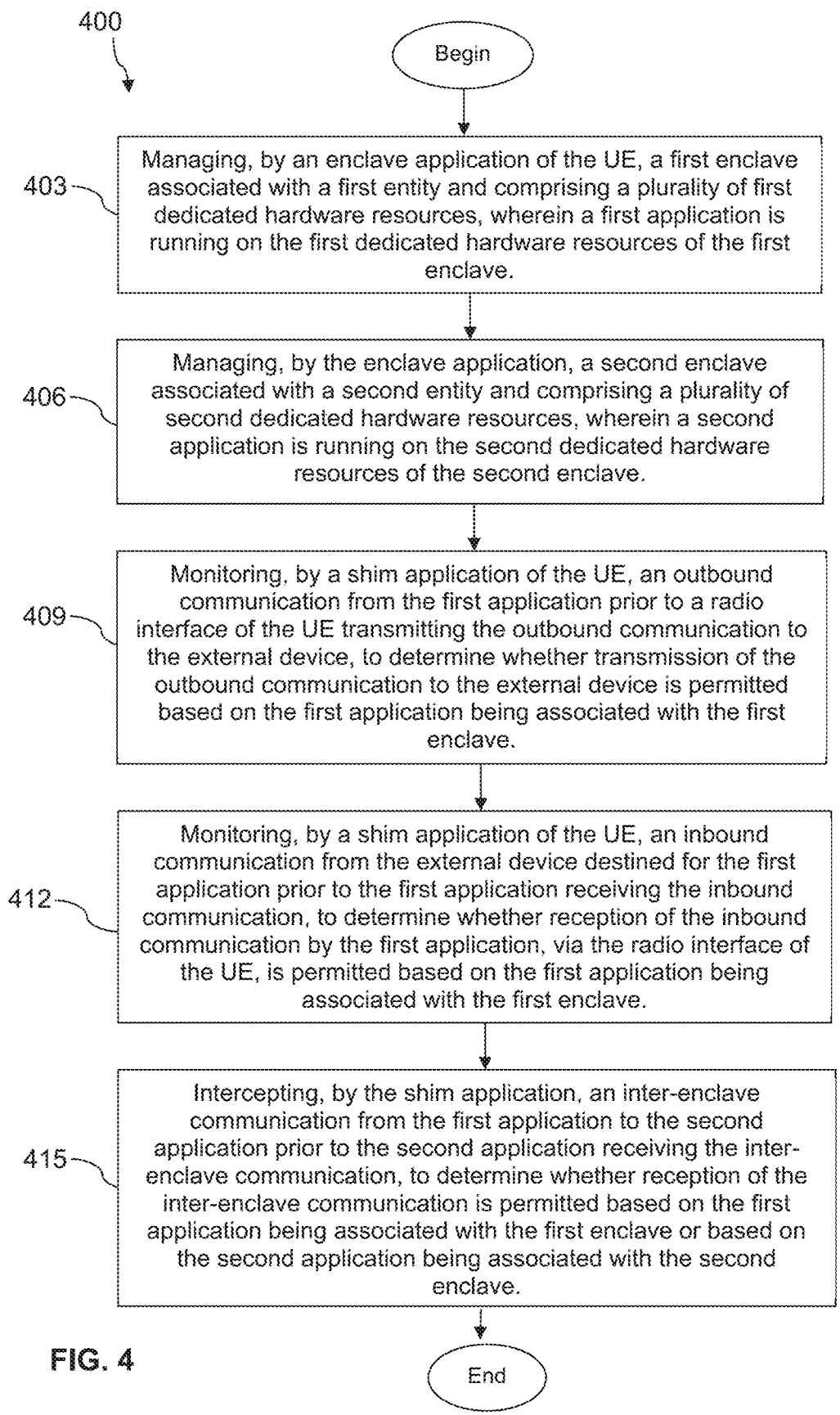
FIG. 4 is a flow chart of a method according to an embodiment of the disclosure.

Turning now to FIG. 4, a method 400 is described. In an embodiment, the method 400 is performed to enforce isolations across enclaves 130A-C (hereinafter referred to as "enclaves 130") at the UE 103. Method 400 may be performed either upon configuration of the UE 103 itself, or upon downloading of one or more applications 125 at the UE 125. Method 400 may be performed by the enclave application 303 and the shim application 140 at the UE 103.

At step 403, method 400 includes managing, by an enclave application 303, a first enclave 130 associated with a first entity and comprising first dedicated hardware resources 223. In an embodiment, a first application 125 may be running on the first dedicated hardware resources 223 in the first enclave 130.

At step 406, method 400 includes managing, by the enclave application 303, a second enclave 130 associated with a second entity and comprising second dedicated hardware resources 223, different from the first dedicated hardware resources 223. In an embodiment, a second application may be running on the second dedicated hardware resources 223 in the second enclave 130.

In an embodiment, the shim application 140 may be configured to monitor and intercept communications transmitted by and received from applications 125 at the UE 103. At step 409, method 400 comprises monitoring, by the shim application 140, an outbound communication from the first application 125, prior to the radio interface 120 transmitting the outbound communication to an external device 112. The shim application 140 may determine whether transmission of the outbound communication to the external device 112 is permitted based on the first application 125 being associated with the first enclave 130.

At step 412, method 400 comprises monitoring, by the shim application 140, an inbound communication received from the external device 112 destined for the first application 125, prior to the first application receiving the inbound communication. In an embodiment, the shim application 140 may determine whether reception of the inbound communication by the first application 125, via the radio interface 120, is permitted based on the first application 125 being associated with the first enclave 130.

At step 415, method 400 comprises intercepting, by the shim application 140, an inter-enclave communication from the first application 125 to the second application 125, prior to the second application 125 receiving the inter-enclave communication. In an embodiment, the shim application 140 may determine whether reception of the inter-enclave communication is permitted based on the first application 125 being associated with the first enclave 130 and/or based on the second application 125 being associated with the second enclave 130.

In an embodiment, the first dedicated hardware resources 223 comprise an address range in the non-transitory memory 118. The shim application 140 may determine whether transmission of the outbound communication to the external device 112 is permitted and determine whether reception of the inbound communication by the first application 125 is permitted based on the address range.

In an embodiment, the policy 143 of the first enclave 130 describes a communication connection type 122, via the radio interface 120, that is permitted or prohibited. In an embodiment, the policy 143 of the first enclave 130 describes an IP and protocol port number that is permitted to or prohibited from communicating with the first application 125. The shim application 140 may determine whether transmission of the outbound communication to the external device 112 is permitted based on the policy 143 of the first enclave 130.

In an embodiment, the shim application 140 may determine whether reception of the inbound communication by the first application 125 is permitted based on whether the inbound communication is an API call to the first application 125 or the second application 125. The shim application 125 may drop the inbound communication when the inbound communication is an API call to the second application 125, but forward the inbound communication to the first application 125 when the inbound communication is an API call to the first application 125.

Figure 5A:
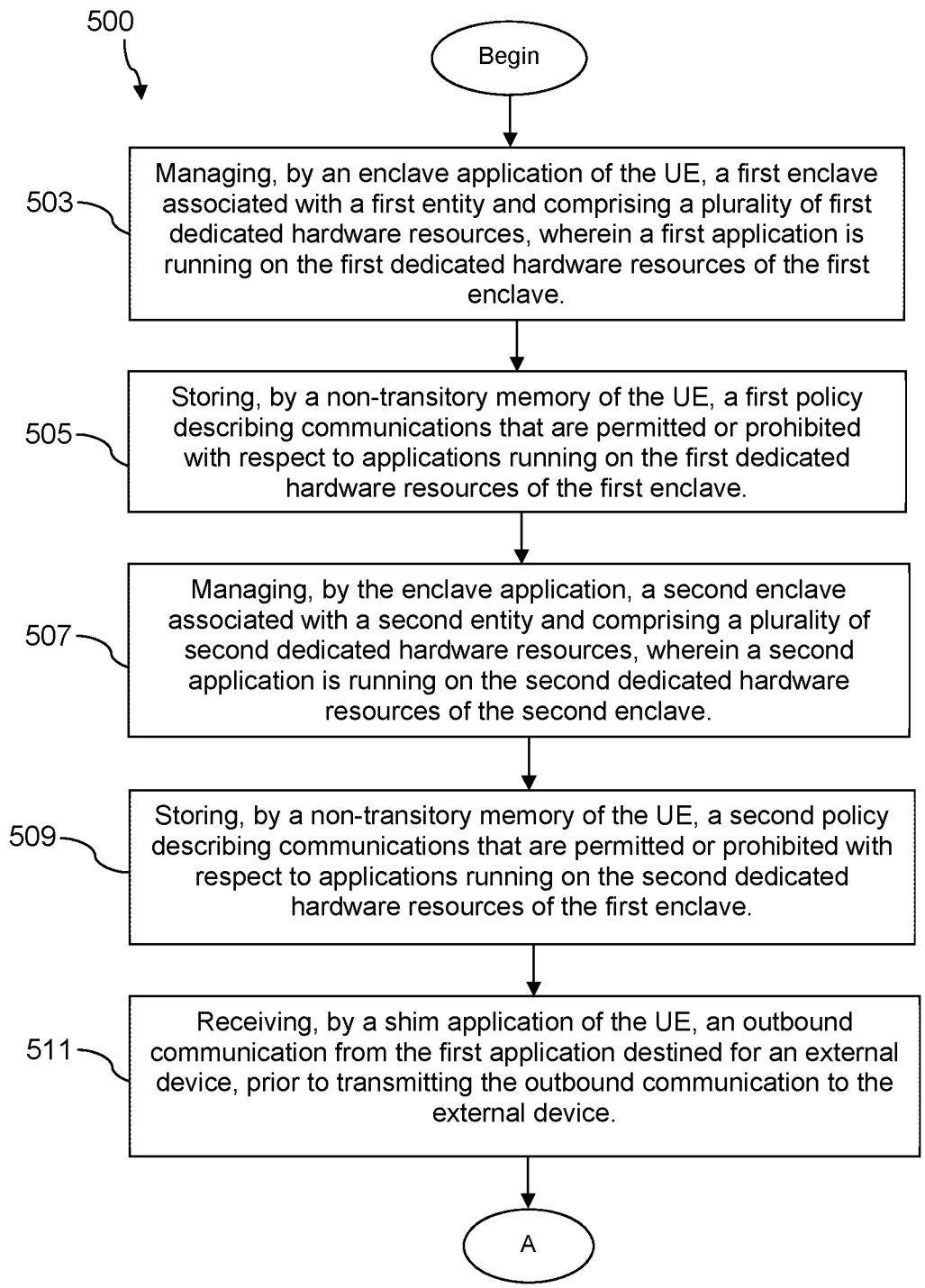
FIGS. 5A-B is a flowchart of another method according to an embodiment of the disclosure.
Figure 5B:
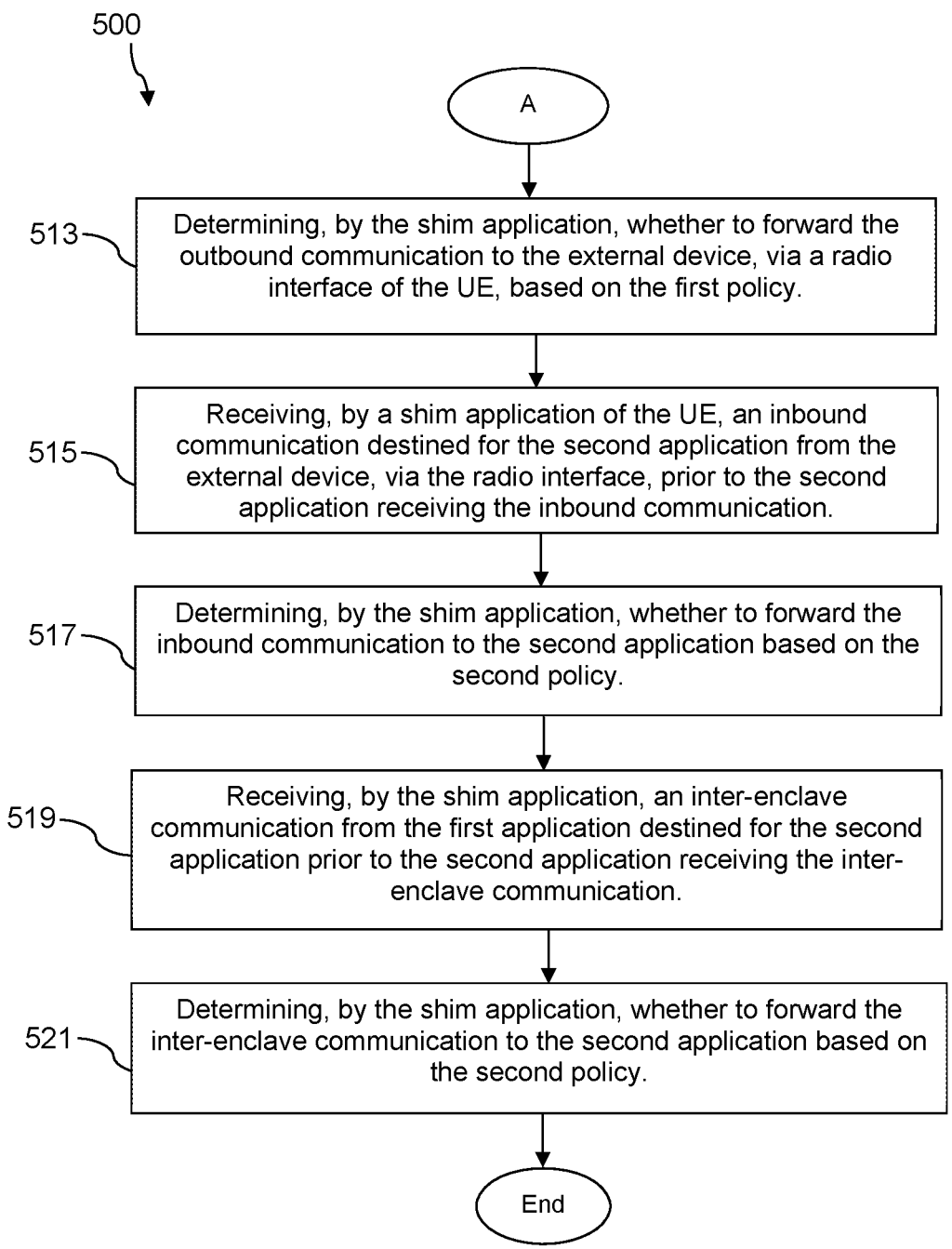

Turning now to FIGS. 5A-B, a method 500 is described. In an embodiment, the method 500 is performed to enforce isolations across enclaves 130 at the UE 103. Method 500 may be performed either upon configuration of the UE 103 itself, or upon downloading of one or more applications 125 at the UE 103. Method 500 may be performed by the enclave application 303 and the shim application 140 at the UE 103. FIG. 5A shows steps 503, 507, 509, and 511, and FIG. 5B shows steps 513, 515, 517, 519, and 521.

Referring to FIG. 5A, at step 503, method 500 includes managing, by an enclave application 303, a first enclave 130 associated with a first entity and comprising first dedicated hardware resources 223. In an embodiment, a first application 125 may be running on the first dedicated hardware resources 223 in the first enclave 130. At step 505, method 500 includes storing, by a non-transitory memory 118 of the UE 103, a first policy 143 describing communications that are permitted or prohibited with respect to applications 125 running on the first dedicated hardware resources 223.

At step 507, method 500 includes managing, by the enclave application 303, a second enclave 130 associated with a second entity and comprising second dedicated hardware resources 223, different from the first dedicated hardware resources 223. In an embodiment, a second application may be running on the second dedicated hardware resources 223 in the second enclave 130. At step 509, method 500 comprises storing, in the non-transitory memory 118, a second policy 143 describing communications that are permitted or prohibited with respect to applications running on the second dedicated hardware resources 223. At step 511, method 500 includes receiving, by the shim application 140, an outbound communication from the first application 125 destined for the external device 112, prior to the radio interface 120 transmitting the outbound communication to the external device.

Turning now to FIG. 5B, at step 513, method 500 includes determining, by the shim application 140, whether to forward the outbound communication to the external device, via the radio interface 120, based on the first policy 143. When the first policy 143 indicates that the outbound communication is permitted, the shim application 140 may forward the outbound communication to the radio interface 120 for transmission. When the first policy 143 indicates that the outbound communication is prohibited, the shim application 140 drops the outbound communication.

As described above, the shim application 140 may make this determination based on information carried in the outbound communication, such as, for example, an identifier or address of the external device 112, an identification (e.g., identifier or name) of the sending application 125, or a memory address of the sending application 125. In an embodiment, the UE 103 may maintain, in the non-transitory memory, a mapping of identifiers of applications 125 and memory address ranges that belong to each enclave 130. The shim application 140 may use the mapping to determine an enclave associated with the address or identifier carried in the communication, and then determine whether the policy 143 prohibits or permits communications accordingly.

At step 515, method 500 includes receiving, by the shim application 140, an inbound communication from the external device 112 via the radio interface 120. The inbound communication may be destined for the second application 125. At step 517, method 500 includes determining, by the shim application 140, whether to forward the inbound communication to the second application 125 based on the second policy 143. The inbound communication may include an address or identification of the external device 112 and an address or identification of the second application 125. The shim application 140 may use the information in the inbound communication and the second policy 143 to determine whether the inbound communication should be forwarded to the second application 125.

At step 519, method 500 includes receiving, by the shim application 140, an inter-enclave communication from the first application 125 destined for the second application 125 prior to the second application 125 receiving the inter-enclave communication. The inter-enclave communication may include an identification or address of the first application 125 and/or the second application 125. At step 521, method 500 includes determining, by the shim application 140, whether to forward the inter-enclave communication to the second application 125 based on the second policy 143. In an embodiment in which the second policy 143 does not exist in the system, a default policy may be preset indicating that inter-enclave communications are prohibited at the UE 103. Otherwise, the shim application 140 may forward or drop the inter-enclave communication according to the second policy 143.

Figure 6:
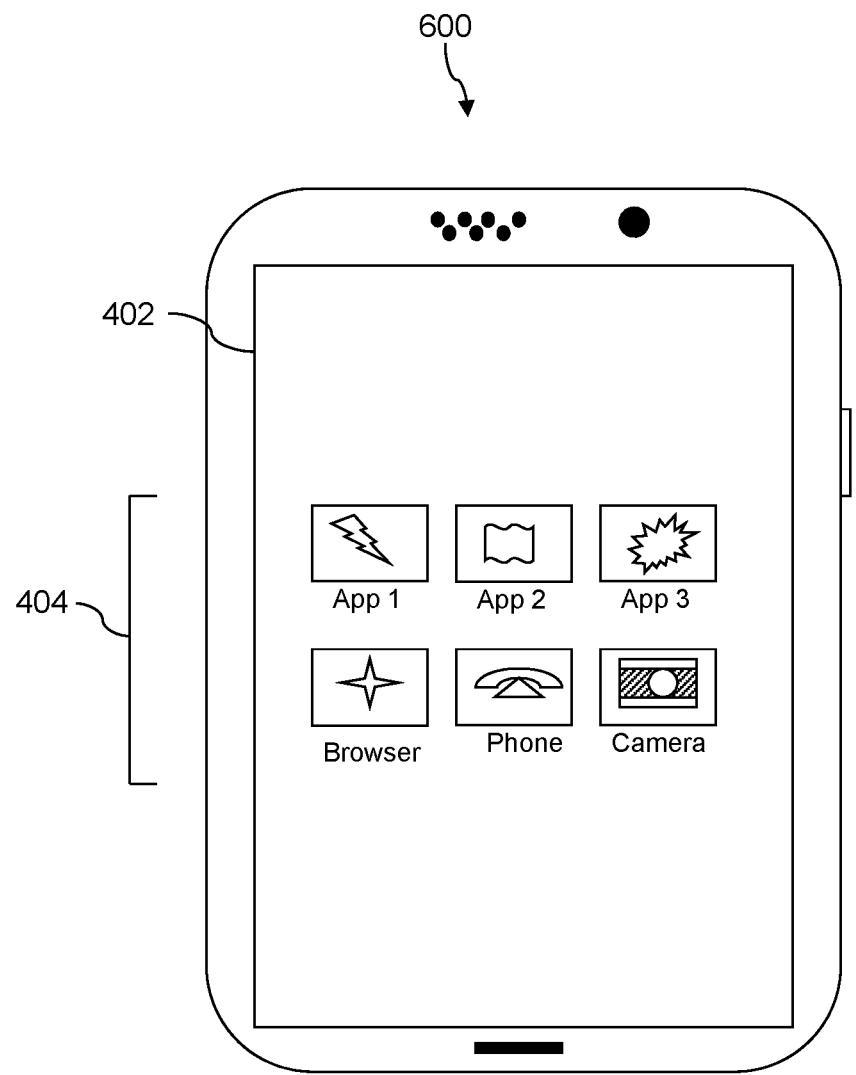
FIG. 6 is an illustration of a wireless communication device according to an embodiment of the disclosure.

FIG. 6 depicts the user equipment (UE) 600, which is operable for implementing aspects of the present disclosure, but the present disclosure should not be limited to these implementations. In an embodiment, UE 600 may be implemented as UE 103. Though illustrated as a mobile phone, the UE 600 may take various forms including a wireless handset, a pager, a personal digital assistant (PDA), a gaming device, or a media player. The UE 600 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 600, a user may be able to download and install additional applications on the UE 600, and an icon associated with such downloaded and installed applications may be added to the touch screen display 402 or to an alternative screen. The UE 600 may have other components such as electro-mechanical switches, speakers, camera lenses, microphones, input and/or output connectors, and other components as are well known in the art. The UE 600 may present options for the user to select, controls for the user to actuate, and/or cursors or other indicators for the user to direct. The UE 600 may further accept data entry from the user, including numbers to dial or various parameter values for configuring the operation of the handset. The UE 600 may further execute one or more software or firmware applications in response to user commands. These applications may configure the UE 600 to perform various customized functions in response to user interaction. Additionally, the UE 600 may be programmed and/or configured over-the-air, for example from a wireless base station, a wireless access point, or a peer UE 600. The UE 600 may execute a web browser application which enables the touch screen display 402 to show a web page. The web page may be obtained via wireless communications with a base transceiver station, a wireless network access node, a peer UE 600 or any other wireless communication network or system.

Figure 7:
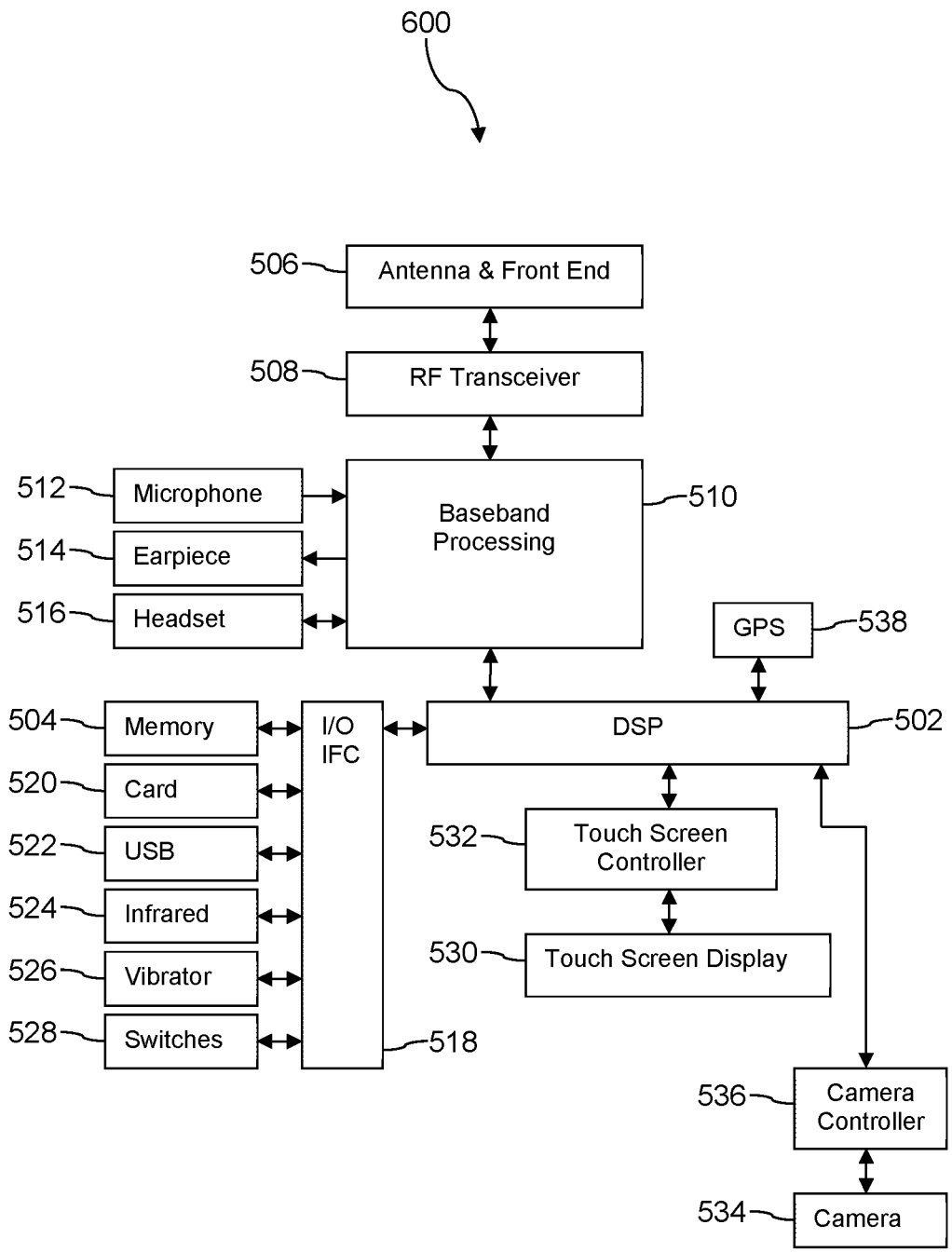
FIG. 7 is a block diagram or a hardware architecture of a wireless communication device according to an embodiment of the disclosure.

FIG. 7 shows a block diagram of the UE 600. In an embodiment, UE 600 may be implemented as the UE 103. While a variety of known components of handsets are depicted, in an embodiment a subset of the listed components and/or additional components not listed may be included in the UE 600. The UE 600 includes a digital signal processor (DSP) 502 and a memory 504. As shown, the UE 600 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 600 may include another kind of display that does not provide a touch sensitive screen. In an embodiment, the UE 600 may include both the touch screen display 530 and additional display component that does not provide a touch sensitive screen. In an embodiment, the DSP 502 may communicate directly with the memory 504 without passing through the input/output interface 518. Additionally, in an embodiment, the UE 600 may comprise other peripheral devices that provide other functionality.

The DSP 502 or some other form of controller or central processing unit operates to control the various components of the UE 600 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 600 to function as a peripheral device to exchange information with a personal computer or other computer system. The infrared port 524 and other optional ports such as a Bluetooth® interface or an IEEE 802.11 compliant wireless interface may enable the UE 600 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 600 may comprise a radio frequency identify (RFID) reader and/or writer device.

The switches 528 may couple to the DSP 502 via the input/output interface 518 to provide one mechanism for the user to provide input to the UE 600. Alternatively, one or more of the switches 528 may be coupled to a motherboard of the UE 600 and/or to components of the UE 600 via a different path (e.g., not via the input/output interface 518), for example coupled to a power control circuit (power button) of the UE 600. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 600 to determine its position.

Figure 8A:
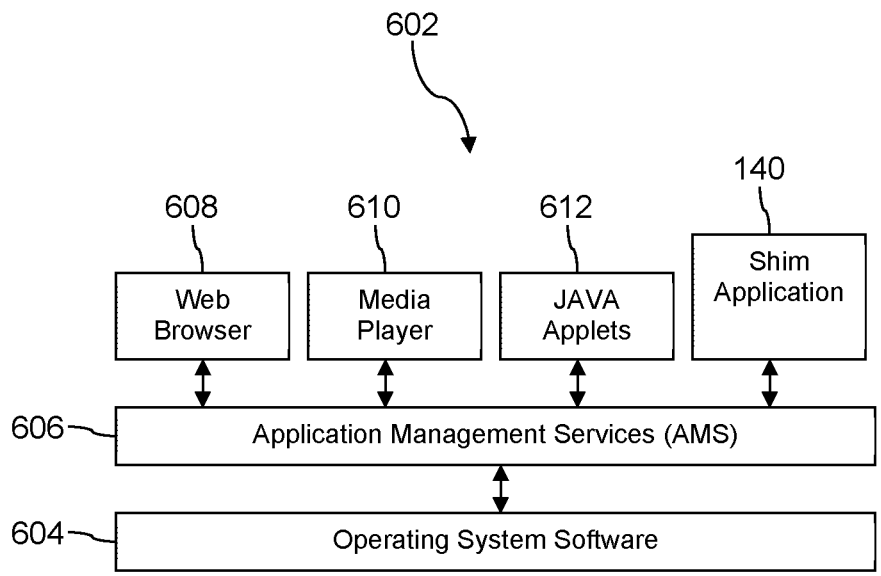
FIG. 8A is a block diagram of a software architecture of a wireless communication device according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 600. Also shown in FIG. 8A are a web browser application 608, a media player application 610, JAVA applets 612, and the shim application 104 and/or the enclave application 303. The web browser application 608 may be executed by the UE 600 to browse content and/or the Internet, for example when the UE 600 is coupled to a network via a wireless link. The web browser application 608 may permit a user to enter information into forms and select links to retrieve and view web pages. The media player application 610 may be executed by the UE 600 to play audio or audiovisual media. The JAVA applets 612 may be executed by the UE 600 to provide a variety of functionality including games, utilities, and other functionality.

Figure 8B:
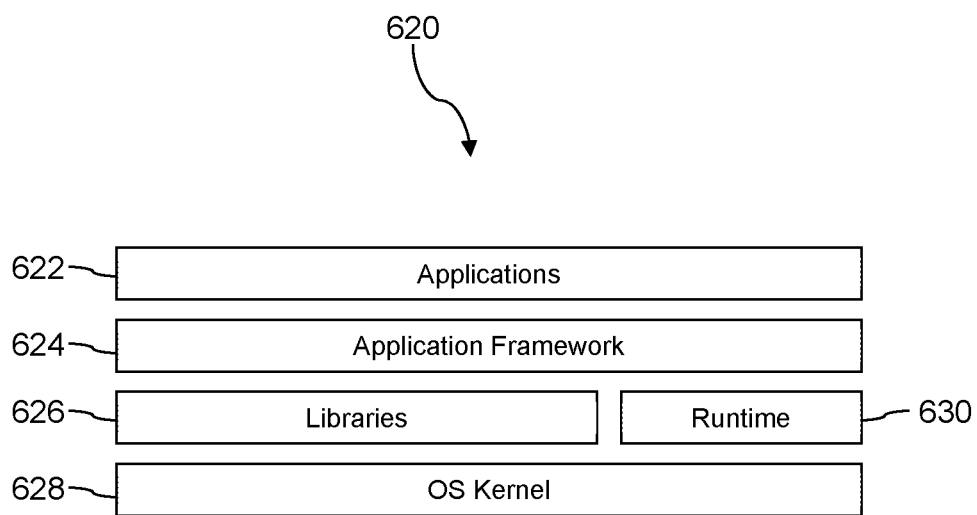
FIG. 8B is a block diagram of another software architecture of a wireless communication device according to an embodiment of the disclosure.

FIG. 8B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
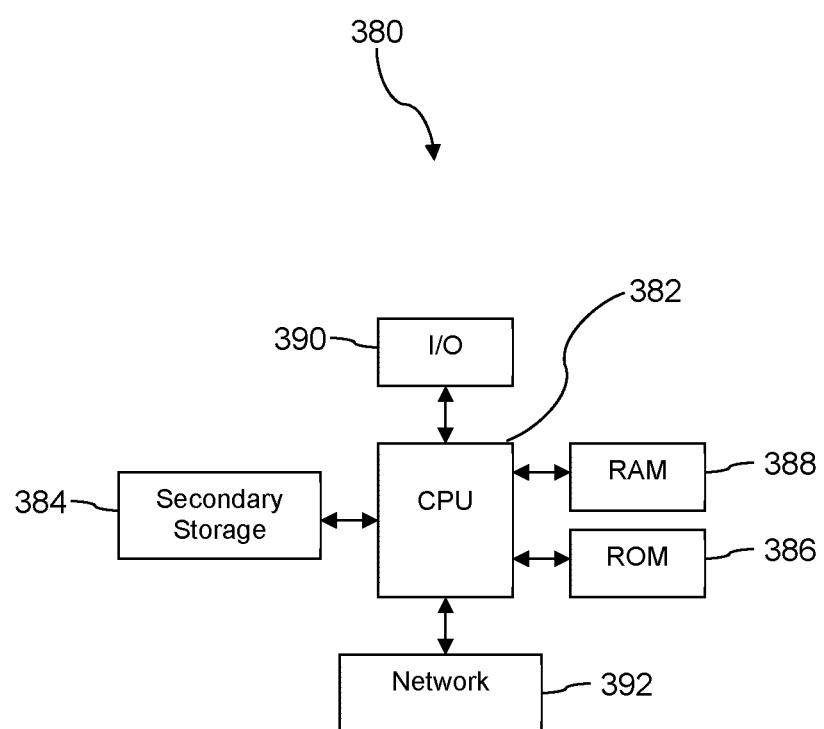
FIG. 9 is a block diagram of a computer system according to an embodiment of the disclosure.

FIG. 9 illustrates a computer system 380 suitable for implementing one or more embodiments disclosed herein. In an embodiment, the UE 103 may be implemented as a computer system 380. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of enforcing isolation enclaves in a user equipment (UE), comprising:
    managing, by an enclave application of the UE, a first enclave associated with a first entity and comprising a plurality of first dedicated hardware resources, wherein a first application is running on the first dedicated hardware resources of the first enclave;
    managing, by the enclave application, a second enclave associated with a second entity and comprising a plurality of second dedicated hardware resources, wherein a second application is running on the second dedicated hardware resources of the second enclave;
    monitoring, by a shim application of the UE, an outbound communication from the first application prior to a radio interface of the UE transmitting the outbound communication to an external device, to determine whether transmission of the outbound communication to the external device is permitted;
    monitoring, by a shim application of the UE, an inbound communication from the external device destined for the first application prior to the first application receiving the inbound communication, to determine whether reception of the inbound communication by the first application, via the radio interface of the UE, is permitted based on the first application being associated with the first enclave; and
    intercepting, by the shim application, an inter-enclave communication from the first application to the second application prior to the second application receiving the inter-enclave communication, to determine whether reception of the inter-enclave communication by the second application is permitted based on the first application being associated with the first enclave or based on the second application being associated with the second enclave.

2. The method of claim 1, wherein the first dedicated hardware resources, running the first application, comprises an address range in a non-transitory memory of the UE, wherein a determination as to whether transmission of the outbound communication to the external device is permitted and as to whether reception of the inbound communication by the first application is permitted is based on the address range.

3. The method of claim 1, further comprising storing, in a non-transitory memory, a policy associated with the first enclave describing a type of communication connection, via the radio interface, of the UE that is permitted or prohibited, wherein a determination as to whether transmission of the outbound communication to the external device is permitted and whether reception of the inbound communication by the first application is permitted is based on the policy associated with the first enclave.

4. The method of claim 1, further comprising storing, in a non-transitory memory, a policy associated with the first enclave describing Internet Protocol (IP) and protocol port numbers that are permitted to or prohibited from communicating with the first application, wherein a determination as to whether transmission of the outbound communication to the external device is permitted and whether reception of the inbound communication by the first application is permitted is based on the policy associated with the first enclave.

5. The method of claim 1, wherein a determination as to whether reception of the inbound communication by the first application is permitted is based on whether the inbound communication is an Application Programming Interface (API) call to the first application or the second application.

6. The method of claim 1, wherein intercepting the inter-enclave communication comprises dropping the inter-enclave communication such that the second application does not receive the inter-enclave communication from the first application.

7. The method of claim 1, wherein the first enclave stores private applications and data, and wherein the second enclave stores business data and applications.

8. A user equipment (UE), comprising:
    a processor;
    a non-transitory memory coupled to the processor;
    a radio interface;

a first enclave, stored in the non-transitory memory, and
associated with a first entity, wherein the first enclave
comprises:
first dedicated hardware resources;
a first container stored in the non-transitory memory,
wherein the first container comprises one or more
first applications associated with the first entity; and
a first enclave application, stored in the non-transitory
memory, such that when executed by the processor,
causes the processor to be configured to manage
allocation of resources within the first dedicated
hardware resources for the first container;
a second enclave, stored in the non-transitory memory,
and associated with a second entity, wherein the second
enclave comprises:
second dedicated hardware resources;
a second container stored in the non-transitory memory,
wherein the second container comprises one or more
second applications associated with the second
entity; and
a second enclave application, stored in the non-transitory memory, such that when executed by the processor, causes the processor to be configured to
manage allocation of resources within the second
dedicated hardware resources for the second container; and
a shim application, stored in the non-transitory memory,
such that when executed by the processor, causes the
processor to be configured to:
forward an outbound communication received from a
first application through the radio interface to an
external device;
forward an inbound communication received from the
radio interface to the first application; and
block an inter-enclave communication received from
the first application and destined for the second
application.

9. The UE of claim 8, further comprising a host operating system stored in the non-transitory memory, and wherein a first guest operating system and a second guest operating system interacts with the host operating system to access hardware resources at the UE on behalf of the first applications and the second applications.

10. The UE of claim 8, further comprising a host operating system stored in the non-transitory memory, wherein the first container and the second container both interact with the host operating system to access hardware resources at the UE on behalf of the first applications and the second applications.

11. The UE of claim 10, wherein the shim application further causes the processor to be configured to forward the outbound communication received from a first application through the radio interface to an external device only when the external device is associated with a domain of the first entity.

12. The UE of claim 10, wherein the shim application further causes the processor to be configured to forward the inbound packed received from the radio interface to the first application when the inbound communication comprises an identification of at least one of the first application, the first enclave, or the first entity.

13. The UE of claim 10, wherein the shim application further causes the processor to be configured to forward the inbound packed received from the radio interface to the first application when the inbound communication comprises Application Programming Interface (API) call to the first application.

14. The UE of claim 10, wherein the shim application further causes the processor to be configured to block the inter-enclave communication received from the first application and destined for the second application when a policy associated with the second entity indicates that applications in the first enclave are prohibited from accessing applications or data in the second enclave.

15. A method of isolating enclaves in a user equipment (UE), comprising:
managing, by an enclave application of the UE, a first
enclave associated with a first entity and comprising a
plurality of first dedicated hardware resources, wherein
a first application is running on the first dedicated
hardware resources of the first enclave;
storing, by a non-transitory memory of the UE, a first
policy describing communications that are permitted or
prohibited with respect to applications running on the
first dedicated hardware resources of the first enclave;
managing, by the enclave application, a second enclave
associated with a second entity and comprising a plurality of second dedicated hardware resources, wherein
a second application is running on the second dedicated
hardware resources of the second enclave;
storing, by a non-transitory memory of the UE, a second
policy describing communications that are permitted or
prohibited with respect to applications running on the
second dedicated hardware resources of the first
enclave;
receiving, by a shim application of the UE, an outbound
communication from the first application destined for
an external device, prior to transmitting the outbound
communication to the external device;
determining, by the shim application, whether to forward
the outbound communication to the external device, via
a radio interface of the UE, based on the first policy;
receiving, by the shim application of the UE, an inbound
communication destined for the second application
from the external device, via the radio interface, prior
to the second application receiving the inbound communication;
determining, by the shim application, whether to forward
the inbound communication to the second application
based on the second policy;
receiving, by the shim application, an inter-enclave communication from the first application destined for the
second application prior to the second application
receiving the inter-enclave communication; and
determining, by the shim application, whether to forward
the inter-enclave communication to the second application based on the second policy.

16. The method of claim 15, wherein the first policy indicates that the outbound communication from the first application is only permitted when the external device is associated with a domain belonging to the first entity, and wherein the method further comprises transmitting, by the shim application, the outbound communication to the radio interface for forwarding to the external device only when the external device is associated with the domain.

17. The method of claim 15, wherein the first policy indicates that the inbound communication is only permitted to be received by the first application via the radio interface using a first type of communication connection via a carrier network associated with an electronic subscriber identity module (eSIM profile), wherein the method further comprises transmitting, by the shim application, the inbound communication to the first application when the inbound communication is received via the radio interface using the first type of communication connection from a cell site of the carrier network.

18. The method of claim 15, wherein data in the first enclave is only permitted to be accessed by applications running in the first enclave, wherein data in the second enclave is only permitted to be accessed by applications running in the second enclave.

19. The method of claim 15, further comprising:
receiving, by the shim application, an Application Programming Interface (API) call to the first application;
prohibiting, by the shim application, the API call from accessing the second enclave.

20. The method of claim 15, wherein the inbound communication indicates an address associated with the first dedicated hardware resources of the first enclave, and wherein the method further comprises prohibiting, by the shim application, the inbound communication from accessing the second enclave.

* * * * *